(12) United States Patent
Arai et al.

(10) Patent No.: US 7,329,004 B2
(45) Date of Patent: *Feb. 12, 2008

(54) REAR PROJECTION DISPLAY DEVICE

(75) Inventors: Kazuhiro Arai, Kadoma (JP); Syoichi Yoshii, Fujiidera (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/197,414

(22) Filed: Aug. 5, 2005

(65) Prior Publication Data
US 2006/0038963 A1 Feb. 23, 2006

Related U.S. Application Data

(63) Continuation of application No. 09/608,067, filed on Jun. 30, 2000.

(30) Foreign Application Priority Data
Jan. 7, 1999 (JP) ................. 11-187893
Jan. 7, 1999 (JP) ................. 11-187894

(51) Int. Cl.
G03B 21/28 (2006.01)
G03B 21/56 (2006.01)
G03B 21/00 (2006.01)
G03B 21/26 (2006.01)
G03B 21/14 (2006.01)
G03B 21/22 (2006.01)
G02F 1/1335 (2006.01)

(52) U.S. Cl. ............... 353/8; 353/20; 353/31; 353/34; 353/37; 353/71; 353/77; 353/119; 349/9; 359/460

(58) Field of Classification Search ............ 353/8, 353/20, 29, 31, 33–34, 37, 71, 74, 77, 119; 349/5, 7–9; 359/460
See application file for complete search history.

(56) References Cited

U.S. PATENT DOCUMENTS

| 4,200,365 | A |   | 4/1980  | Keondjian et al. |
| 4,516,837 | A |   | 5/1985  | Soref et al. |
| 4,544,946 | A |   | 10/1985 | VanBreemen |
| 4,995,718 | A |   | 2/1991  | Jachimowicz et al. |
| 5,048,949 | A |   | 9/1991  | Sato et al. |
| 5,090,800 | A |   | 2/1992  | Ushiro |
| 5,097,323 | A |   | 3/1992  | Sato et al. |
| 5,285,287 | A | * | 2/1994  | Shikama ............ 348/745 |
| 5,477,394 | A |   | 12/1995 | Shibazaki |

(Continued)

FOREIGN PATENT DOCUMENTS

JP 01120192 5/1989

(Continued)

Primary Examiner—Diane Lee
Assistant Examiner—Magda Cruz
(74) Attorney, Agent, or Firm—NDQ&M Watchstone LLP; S. Peter Konzel

(57) ABSTRACT

A rear projection display device improves the brightness by improving the utilization efficiency of image light projected to a screen from slantly below. At least a green component of the image light is P-polarized to the screen (7). Therefore, reflection of light on the screen (7) is reduced.

11 Claims, 9 Drawing Sheets

| U.S. PATENT DOCUMENTS | | | | FOREIGN PATENT DOCUMENTS | | |
|---|---|---|---|---|---|---|
| 6,082,861 A | 7/2000 | Dove et al. | | JP | 07-281178 | 10/1995 |
| 6,089,718 A * | 7/2000 | Hashizume | 353/31 | JP | 09-093598 | 4/1997 |
| 6,217,174 B1 | 4/2001 | Knox | | JP | 11-064973 | 3/1999 |
| 6,250,764 B1 | 6/2001 | Aoki et al. | | JP | 11-504441 | 4/1999 |
| 6,343,864 B1 | 2/2002 | Tajiri | | WO | 96/37806 | 11/1996 |
| 6,369,010 B1 | 4/2002 | Suzuki et al. | | WO | 99/13378 | 3/1999 |
| 6,449,089 B1 * | 9/2002 | Moshrefzadeh et al. | 359/454 | | | |
| 6,626,540 B2 | 9/2003 | Ouchi et al. | | * cited by examiner | | | reflectivity characteristic of light incident from acrylic resin to air (refractive index=1.492)

REAR PROJECTION DISPLAY DEVICE

This application is a Continuation Application which claims the benefit of pending U.S. patent application Ser. No. 09/608,067, filed Jun. 30, 2000, which in turn claim priority to foreign application nos. 187893/1999, filed, Jul. 1, 1999 in Japan, and 187894/1999, filed, Jul. 1, 1999 in Japan. The disclosure of the prior applications are hereby incorporated by reference herein in its entirety.

BACKGROUND OF THE INVENTION

1. Field of the Invention

This invention relates to a rear projection display device for enabling an observer to observe a picture on a front surface of a screen by slantly projecting image light on a back surface of the screen.

2. Description of the Prior Art

FIGS. 9, 10 illustrate one example of a conventional rear projection display device. FIG. 9 is a cross sectional view schematically illustrating a structure of a conventional rear projection display device, and FIG. 10 is a top plan view schematically illustrating a structure of a projection unit of the rear projection display device of FIG. 9. In the following description, a coordinate system is used where a horizontal direction of a rectangle screen 170 is taken along an x-axis, a vertical direction of the screen 170 is taken along a y-axis, and a perpendicular direction to the screen 170 is taken along a z-axis.

As shown in FIG. 9, the rear projection display device includes a projection unit 120 arranged in a body 110. A projection lens 130 is arranged on a light emitting opening of the projection unit 120. A reflecting mirror 160 is arranged on an inner back surface of the body 110, and a transmission type diffusing screen 170 is arranged on the front of the body 110. Image light which is magnified and projected from the projection unit 120 through the projection lens 130 is reflected on the reflecting mirror 160, is irradiated onto a back surface of the diffusing screen 170, and then a picture is observed on the front surface of the diffusing screen 170.

As shown in FIG. 10, the projection unit 120 includes a white light source 121 comprising a lamp 121a and a reflector 121b. Dichroic mirrors 122, 123 split white light emitted from the white light source 121 into light of three colors. A first dichroic mirror 122 selectively reflects light of a red component (referred as red light hereinafter) out of the white light emitted from the lamp 121a and transmits light of other color components. A second dichroic mirror 123 selectively reflects light of a green component (referred as green light hereinafter). Green light out of the light which is transmitted through the first dichroic mirror 122 is selectively reflected on the second dichroic mirror 123 and is introduced to a liquid crystal panel 127g for green. Light of a blue component (referred as blue light hereinafter) out of the light transmitted through the second dichroic mirror 123 is introduced to a liquid crystal panel 127b for blue by reflecting mirrors 125, 126. The red light reflected on the first dichroic mirror 122 is introduced to a liquid crystal panel 127r for red by the first reflecting mirror 124.

Color light respectively modulated at the liquid crystal panels 127r, 127g, and 127b is synthesized at a dichroic prism 128 and is emitted to the projection lens 130.

Incident directions of the color light modulated at the liquid crystal panels 127r, 127g, and 127b to the dichroic prism 128 is set with consideration of color reproducibility at the dichroic prism 128. Light reflected on the dichroic prism 128 is S-polarized light, and light transmitted through the dichroic prism 128 is P-polarized light.

S-polarized light is a linearly polarized light which the oscillation direction of the electric vector of light incident to a sample surface is vertical to a surface including a normal of the sample surface and a normal of wave surface which is a light traveling direction. P-polarized light is a linearly polarized light which the oscillation direction of the electric vector of light incident to a sample surface is included in an incident surface (a surface including a normal of the sample surface and a light traveling direction).

Specifically the red light out of the light incident to the dichroic prism 128 is set to be S-polarized to a bonded surface 128x. A polarized light component which is perpendicular to an x-z plane is reflected on the bonded surface 128x. The green light is set to be P-polarized light to the bonded surfaces 128x, 128y. A polarized light component which is parallel to the x-z plane is transmitted through the bonded surface 128x, 128y. The blue light is set to be S-polarized light to the bonded surface 128y. A polarized light component which is perpendicular to the x-z plane is reflected on the bonded surface 128y. And then the red, green, and blue light is color-synthesized.

The color-synthesized image light is irradiated from the projection lens 130 to the back surface of the screen 170 through the reflecting mirror 160.

Recently a rear projection display device capable of slantly irradiating image light to the screen 170 for reducing the depth of the device has been proposed. When the above mentioned projection unit 120 is used for slantly projecting image, a polarization direction of the projected image light to the screen 170 is set in the direction orthogonal with the polarization direction of the image light to the dichroic prism 128. The red light is P-polarized, the green light is S-polarized, and the blue light is P-polarized.

When the image light is slantly projected to the screen 170, the light is incident to the acrylic resin from an air with a certain angle of incidence out of a vertical incidence. FIG. 6 is a table showing the reflectivity characteristic of light incident to the acrylic resin from the air. As shown in FIG. 6, when the image light is slantly projected on the screen 170, the reflectivity of P-polarized light to the screen 170 is lowered while the reflectivity of S-polarized light to the screen 170 increases.

FIG. 8 presents the spectral luminous efficiency characteristics of a man. As shown in FIG. 8, the spectral luminous efficiency of man's eyes is the highest at around a wavelength of 555 nm which corresponds to a color of green and a man is likely to recognize green light brighter in comparison with red and blue light.

As a result, when the image light is slantly projected by using the conventional projection unit 120, the reflectivity of the brightest green light at the screen 120 increases, and the brightness as a whole is lowered, and furthermore the image quality is degraded because of the reflected light.

SUMMARY OF THE INVENTION

The present invention was made to solve the above problem and has an objective to provide a rear projection display device capable of improving brightness and image quality by improving the utilization efficiency of image light which is slantly projected on a screen.

A rear projection display device of this invention comprises a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from slantly above or from slantly below. A polarization direction of at least a green component out of the image light irradiated on the screen is parallel to a vertical cross section of the screen.

When image light is projected to a screen from slantly above or from slantly below, an angle formed by a principal ray of light incident to the screen and a normal of the screen is larger in a vertical direction than in a horizontal direction. Therefore, when a polarization direction of a green component, of which spectral luminous efficiency for man's eyes is high, is made parallel to a vertical cross section of the screen, less image light is reflected and lost on a back surface of the screen.

Specifically, polarization direction adjusting means is provided for adjusting a polarization direction of at least the green component out of the image light synthesized by the color synthesizing means so that the polarization direction of at least the green component is parallel to the vertical cross section of the screen.

This structure ensures that a polarization direction of the green component out of the image light synthesized by the color synthesizing means is adjusted so as to be parallel to a vertical cross section of the screen when the polarization direction of the green light is not parallel to the vertical cross section.

It is preferred that polarization directions of all the color components of the image light irradiated on the screen are parallel to the vertical cross section of the screen.

Specifically, polarization direction adjusting means is provided for selectively adjusting a color component, of which a polarization direction is orthogonal with the vertical cross section of the screen, out of the image light synthesized by the color synthesizing means so that the polarization direction of the color component is parallel to the vertical cross section of the screen.

This structure ensures that a color component having a polarization direction orthogonal with a vertical cross section of the screen, out of the image light synthesized by the color synthesizing means is selectively adjusted so that the polarization direction is parallel to the vertical cross section of the screen.

A rear projection display device of this invention comprises a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from a slant side. A polarization direction of at least a green component out of the image light irradiated on the screen is parallel to a horizontal cross section of the screen.

When image light is projected to a screen from a slant side, an angle formed by a principal ray of light incident to the screen and a normal of the screen is larger in a horizontal direction than in a vertical direction. Therefore, when a polarization direction of a green component, of which spectral luminous efficiency for man's eyes is high, is made parallel to a horizontal cross section of the screen, less image light is reflected and lost on a back surface of the screen.

Specifically, polarization direction adjusting means is provided for adjusting a polarization direction of at least the green component out of the image light irradiated on the screen so that the polarization direction of at least the green component is parallel to the horizontal cross section of the screen.

This structure ensures that a polarization direction of the green component out of the image light synthesized by the color synthesizing means is adjusted so as to be parallel to a horizontal cross section of the screen even when the polarization direction of the green light is not parallel to the horizontal cross section.

It is preferred that polarization directions of all the color components of the image light irradiated on the screen are parallel to the horizontal cross section of the screen.

Specifically, polarization direction adjusting means is provided for selectively adjusting a color component, of which polarization direction is orthogonal with the horizontal cross section of the screen, out of the image light synthesized by the color synthesizing means so that the polarization direction of the color component is parallel to the horizontal cross section of the screen.

This structure ensures that a polarization direction of a color component out of the image light synthesized by the color synthesizing means is selectively adjusted so as to be parallel to a horizontal cross section of the screen.

A rear projection display device of this invention comprises a light source lamp, color splitting means for splitting light emitted from the light source lamp into a plurality of color components, a plurality of liquid crystal panels for optically modulating the light of each color split by the color splitting means, color synthesizing means for synthesizing each of the color light modulated by the liquid crystal panels, and projection means for slantly projecting image light which is color-synthesized by the color synthesizing means on a screen. A polarization direction of at least a green component out of the image light irradiated on the screen is parallel to a plane including the image light irradiated on the screen and a normal of the screen.

When image light is slantly projected to a screen, an angle formed by a principal ray of light incident to the screen and a normal of the screen is maximum in a plane including the image light irradiated on the screen and a normal of the screen. Therefore, when a polarization direction of a green component, of which spectral luminous efficiency for man's eyes is high, is made parallel to the plane including the image light irradiated on the screen and a normal of the screen, less image light is reflected and lost on a back surface of the screen.

Specifically polarization direction adjusting means is provided for adjusting a polarization direction of at least the green component out of the image light irradiated on the screen so that the polarization direction of at least the green component is parallel to the plane including the image light irradiated on the screen and the normal of the screen.

This structure ensures that a polarization direction of the green component out of the image light synthesized by the color synthesizing means is adjusted so as to be parallel to a plane including the image light irradiated on the screen and a normal of the screen by the polarization direction adjusting means even when the polarization direction of the green light is not parallel to the plane including the image light irradiated on the screen and a normal of the screen.

It is preferred that polarization directions of all the color components of the image light irradiated on the screen are parallel to the a plane including the image light irradiated on the screen and a normal of the screen.

Specifically polarization direction adjusting means is provided for selectively adjusting a color component, of which a polarization direction is orthogonal with the plane including the image light irradiated on the screen and the normal of the screen, out of the image light synthesized by the color synthesizing means so that the polarization direction of the color component is parallel to the plane including the image light irradiated on the screen and a normal of the screen.

This structure ensures that a color component of which a polarization direction is orthogonal with a plane including image light irradiated on the screen and a normal of the screen out of the image light synthesized by the color synthesizing means is selectively adjusted so that the color component is made parallel to a plane including the image light irradiated on the screen and the normal of the screen.

The polarization direction adjusting means comprises a retardation plate.

The projection means includes a plurality of aspherical mirrors functioning as a lens.

In a rear projection display device of this invention which image light is irradiated to the back surface of the screen from slantly behind or slantly above and a picture is observed on a front surface of the screen, the relation i-min<α<i-max is satisfied, where an angle of a maximum value i-max and a minimum value i-min is formed by a normal of a back surface of the screen and a principal ray of the image light irradiated on the back surface of the screen, and an angle α is obtained when the reflectivity of light, having a polarization direction parallel to the vertical cross section of the screen, to the back surface of the screen is minimum.

In this structure, light having a polarization direction parallel to a vertical cross section of a screen is irradiated on a back surface of the screen at an angle including the angle α at which the reflectivity to a normal of a back surface of the screen at the back surface of the screen is low.

In a rear projection display device of this invention, the relation j-min<β<j-max is satisfied, where an angle of a maximum value j-max and a minimum value j-min are formed by a normal of a front surface of the screen and a principal ray of the image light irradiated on the front surface of the screen, and an angle β is obtained when the reflectivity of light, having a polarization direction parallel to the vertical cross section of the screen, to the front surface of the screen is minimum.

In this structure, light having a polarization direction parallel to a vertical cross section of a screen is irradiated on a front surface of the screen at an angle including the angle β at which the reflectivity to a normal of a back surface of the screen at the back surface of the screen is low.

The screen includes a fresnel lens and the front surface of the screen is an inclined surface with a ring body shaped protrusion of the fresnel lens.

The polarization direction of at least the green component out of the image light irradiated on the screen is parallel to the vertical cross section of the screen.

When a polarization direction of a green component, of which spectral luminous efficiency for man's eyes is high, is made parallel to a vertical cross section of the screen, less image light is reflected and lost on a back surface of the screen.

In a rear projection display device of this invention which image light is irradiated to the back surface of the screen from a slant side and a picture is observed on a front surface of the screen, the relation i-min<α<i-max is satisfied, where an angle of a maximum value i-max and a minimum value i-min of is formed by a normal of a back surface of the screen and a principal ray of the image light irradiated on the back surface of the screen, and an angle α is obtained when the reflectivity of light, having a polarization direction parallel to the horizontal cross section of the screen, to the back surface of the screen is minimum.

In this structure, light having a polarization direction parallel to a horizontal cross section of a screen is irradiated on a back surface of the screen at an angle including the angle α at which the reflectivity to a normal of a back surface of the screen at the back surface of the screen is low.

In a rear projection display device of this invention, the relation j-min<β<j-max is satisfied, where an angle of a maximum value j-max and a minimum value j-min is formed by a normal of a front surface of the screen and a principal ray of the image light irradiated on the front surface of the screen, and an angle β is obtained when the reflectivity of light, having a polarization direction parallel to the horizontal cross section of the screen, to the front surface of the screen is minimum.

In this structure, light having a polarization direction parallel to a horizontal cross section of a screen is irradiated on a front surface of the screen at an angle including the angle β at which the reflectivity to a normal of a back surface of the screen at the back surface of the screen is low.

The screen includes a fresnel lens and the front surface of the screen is an inclined surface with a ring body shaped protrusion of the fresnel lens.

The polarization direction of at least the green component out of the image light irradiated on the screen is parallel to the horizontal cross section of the screen.

When a polarization direction of a green component, of which spectral luminous efficiency for man's eyes is high, is made parallel to a horizontal cross section of the screen, less image light is reflected and lost on a back surface of the screen.

In a rear projection display device of this invention which image light is slantly irradiated to the back surface of the screen and a picture is observed on a front surface of the screen, the relation i-min<α<i-max is satisfied, where an angle of a maximum value i-max and a minimum value i-min is formed by a normal of a back surface of the screen and a principal ray of the image light irradiated on the back surface of the screen, and an angle α is obtained when the reflectivity of light, having a polarization direction parallel to a plane including image light irradiated on the back surface of the screen and a normal of the back surface of the screen, to the back surface of the screen is minimum.

In this structure, light having a polarization direction parallel to the plane including image light irradiated on the back surface of the screen and a normal of the back surface of the screen is irradiated on a back surface of the screen at an angle including the angle α at which the reflectivity to a normal of a back surface of the screen at the screen is low.

In a rear projection display device of this invention, the relation j-min<β<j-max is satisfied, where an angle of a maximum value j-max and a minimum value j-min is formed by a normal of a front surface of the screen and a principal ray of the image light irradiated on the front surface of the screen, and an angle β is obtained when the reflectivity of light, having a polarization direction parallel to the plane including image light irradiated on the front surface of the screen and a normal of the front surface of the screen, to the front surface of the screen is minimum.

In this structure, light having a polarization direction parallel to a plane including image light irradiated on the front surface of the screen and a normal of the front surface of the screen is irradiated on a front surface of the screen at an angle including the angle β at which the reflectivity to a normal of a front surface of the screen at the front surface of the screen is low.

The screen includes a fresnel lens and the front surface of the screen is an inclined surface with a ring body shaped protrusion of the fresnel lens.

The polarization direction of at least the green component out of the image light irradiated on the screen is parallel to a plane including image light irradiated on the back surface of the screen and a normal of the back surface of the screen.

When a polarization direction of a green component, of which spectral luminous efficiency for man's eyes is high, is made parallel to a plane including image light irradiated on the front surface of the screen and a normal of the front surface of the screen, less image light is reflected and lost on a back surface of the screen.

Figure 1:
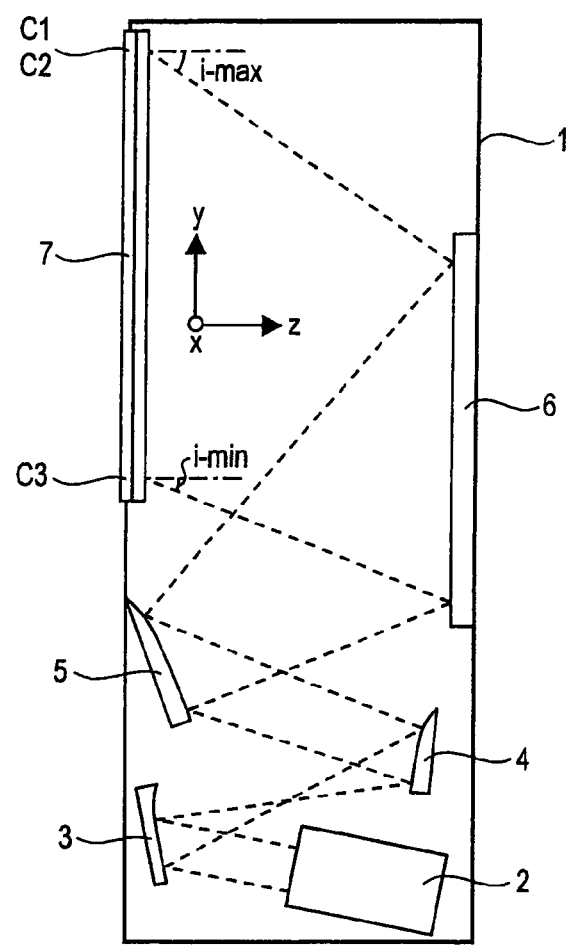
FIG. 1 is a cross sectional view schematically illustrating a structure of a rear projection display device of one embodiment according to the present invention.

The foregoing and other objects, features, aspects and advantages of the present invention will become more apparent from the following detailed description of the present invention when collected conjunction with the accompanying drawings.

DESCRIPTION OF THE PREFFERED EMBODIMENT

Explanation is made on one embodiment of a rear projection display device according to the present invention by referring to the drawings. In the following description, a coordinate system where a width direction of a rectanglar screen 7 is taken along an x-axis, a height direction of the screen 7 is taken along a y-axis, and a perpendicular direction to the screen 7 is taken along a z-axis.

Figure 2:
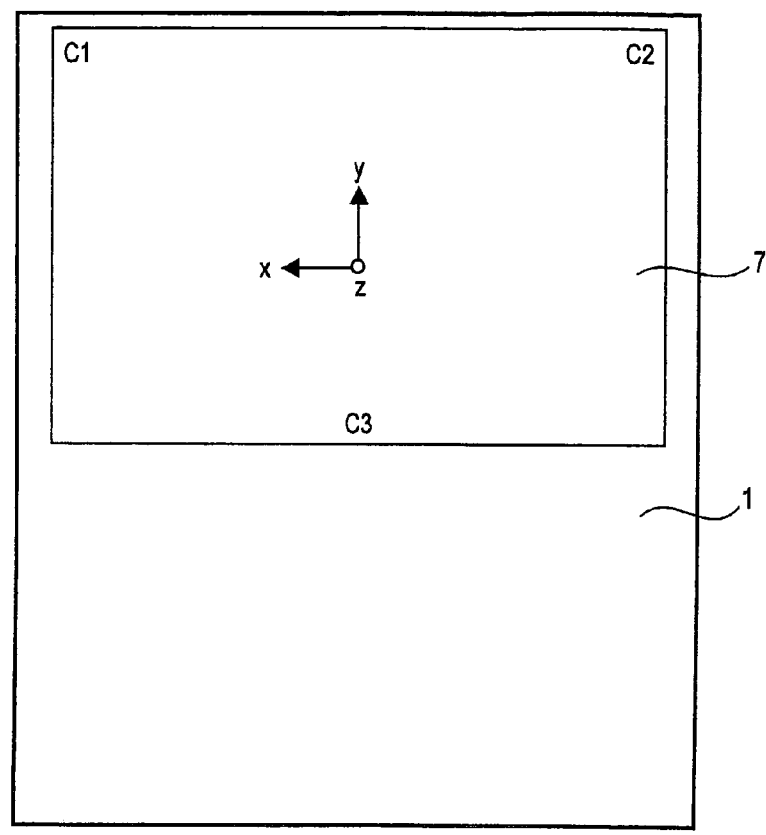
FIG. 2 is a front elevation of the rear projection display device of FIG. 1.
Figure 3:
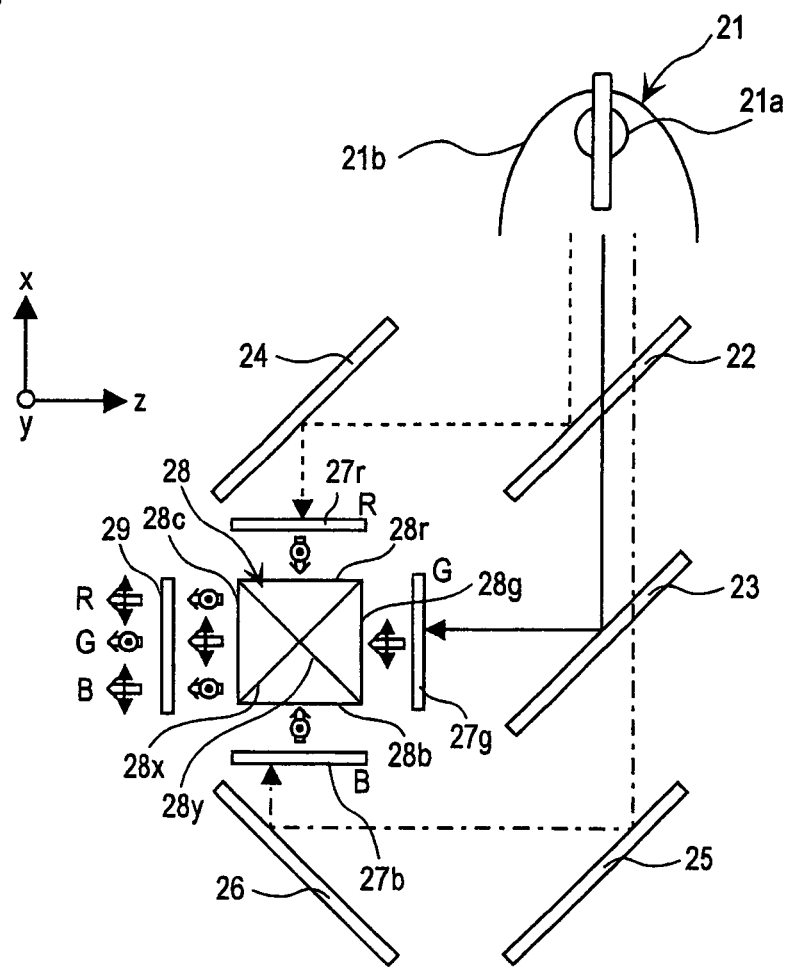
FIG. 3 is a top plan view schematically illustrating a projection unit of the rear projection display device of FIG. 1.
Figure 4:
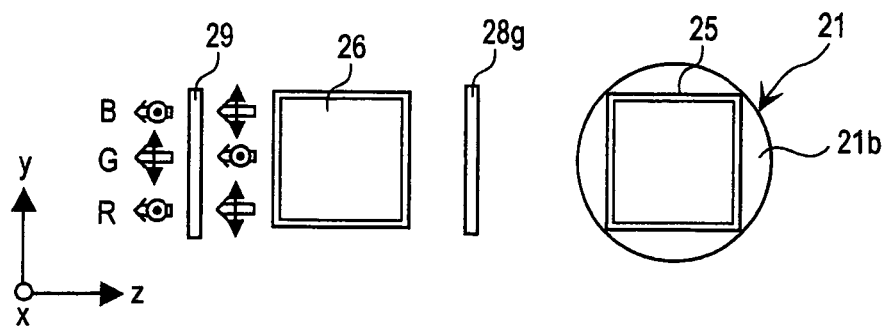
FIG. 4 is a side view of the projection unit of FIG. 3.
Figure 5:
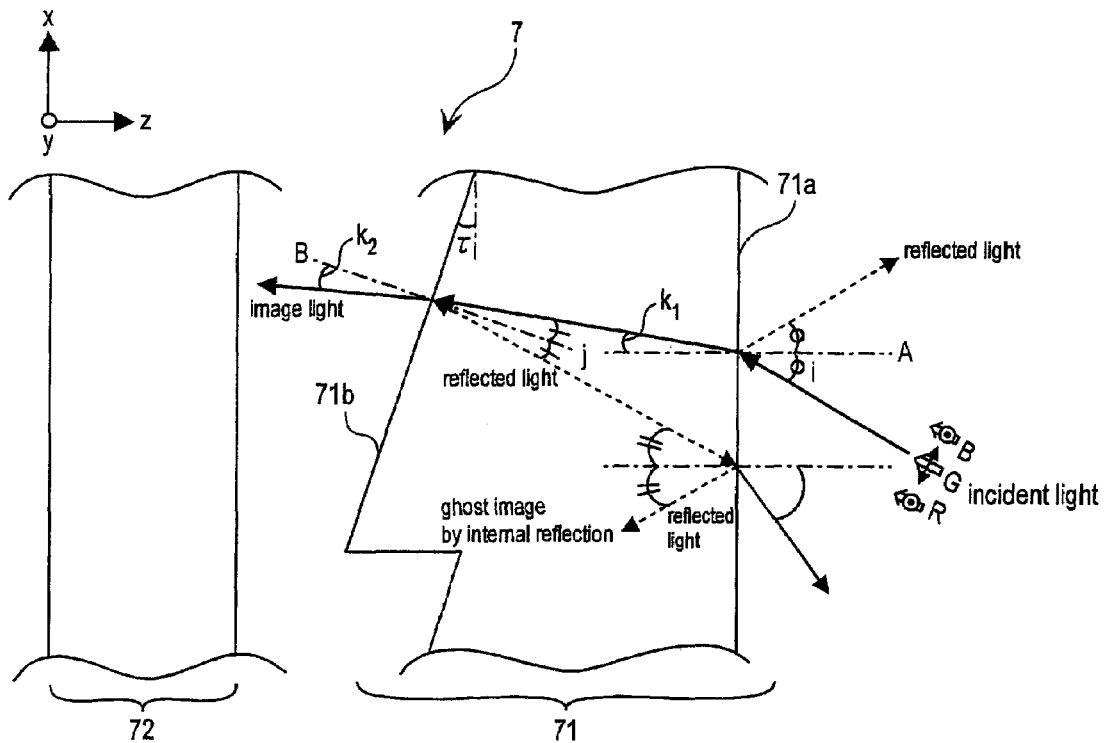
FIG. 5 is an enlarged segmentary sectional view of a screen of the rear projection display device of FIG. 1.
Figure 6:
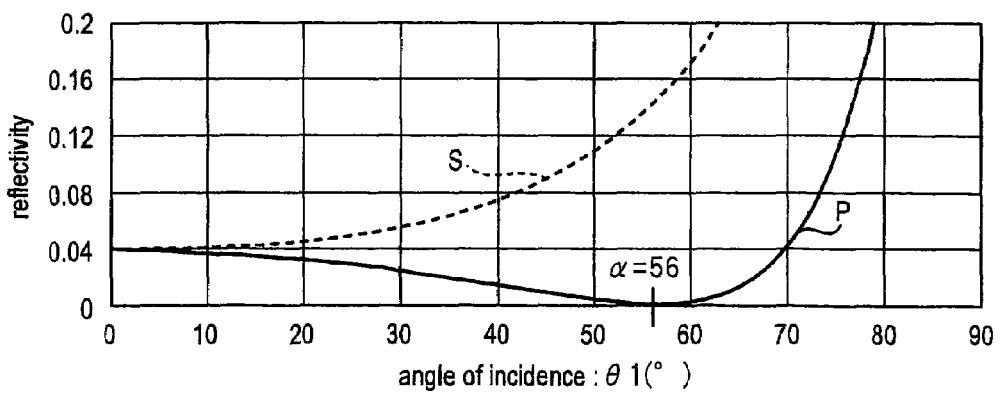
FIG. 6 is a graph of the reflectivity characteristic of light incident to acrylic resin from the air.
Figure 7:
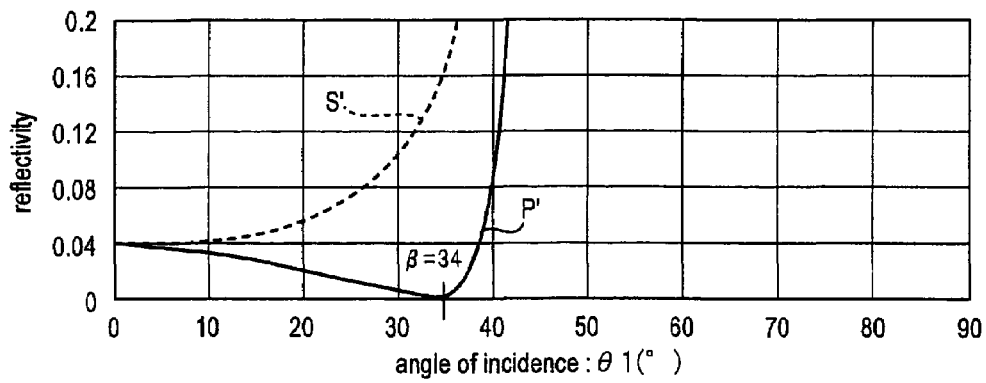
FIG. 7 is a graph of the reflectivity characteristic of light emitted from the acrylic resin to the air.
Figure 8:
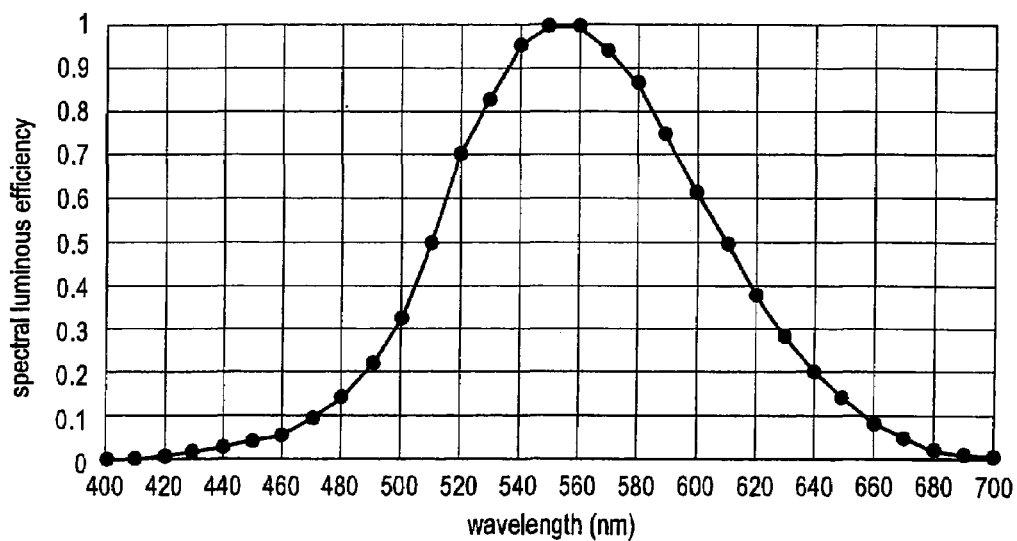
FIG. 8 is a graph of spectral luminous efficiency characteristics of a man.
Figure 9:
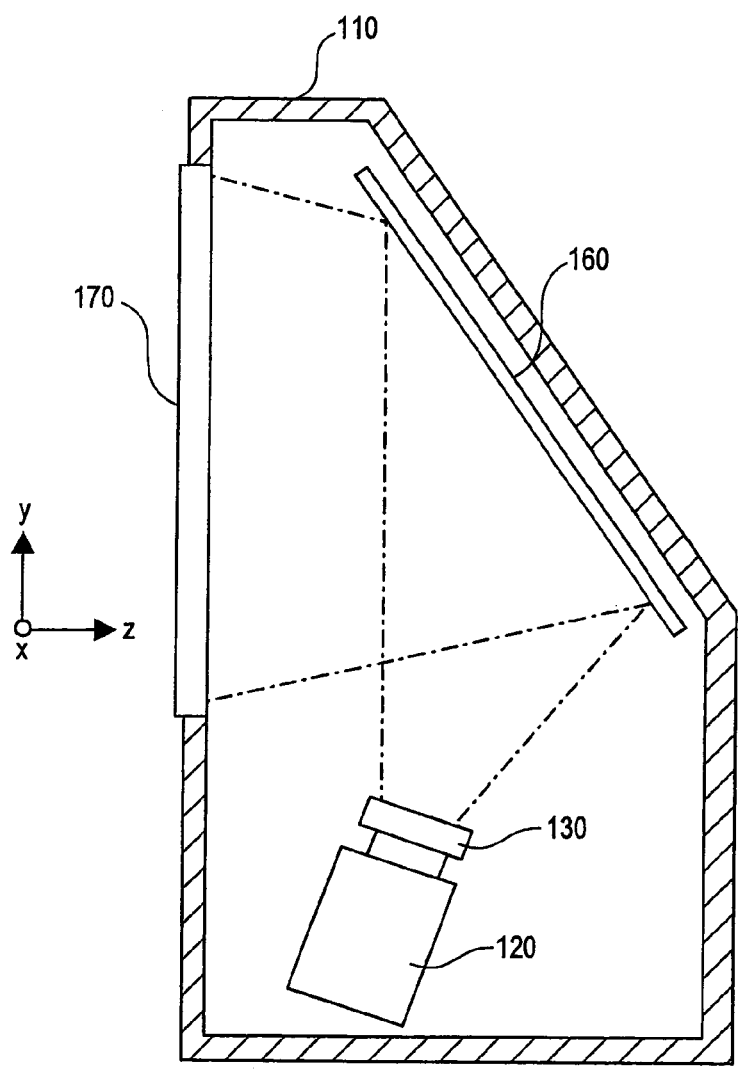
FIG. 9 is a cross sectional view schematically illustrating a structure of a conventional rear projection display device.
Figure 10:
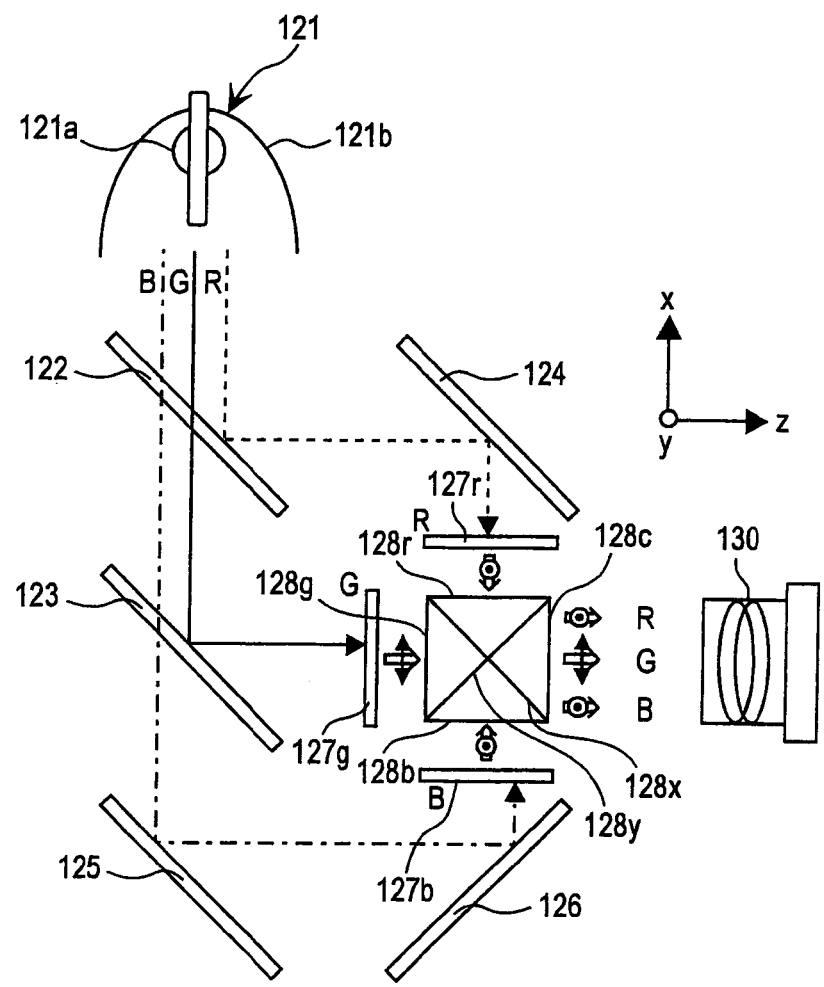
FIG. 10 is a top plan view of a projection unit of the rear projection display device of FIG. 9.
Figure 11:
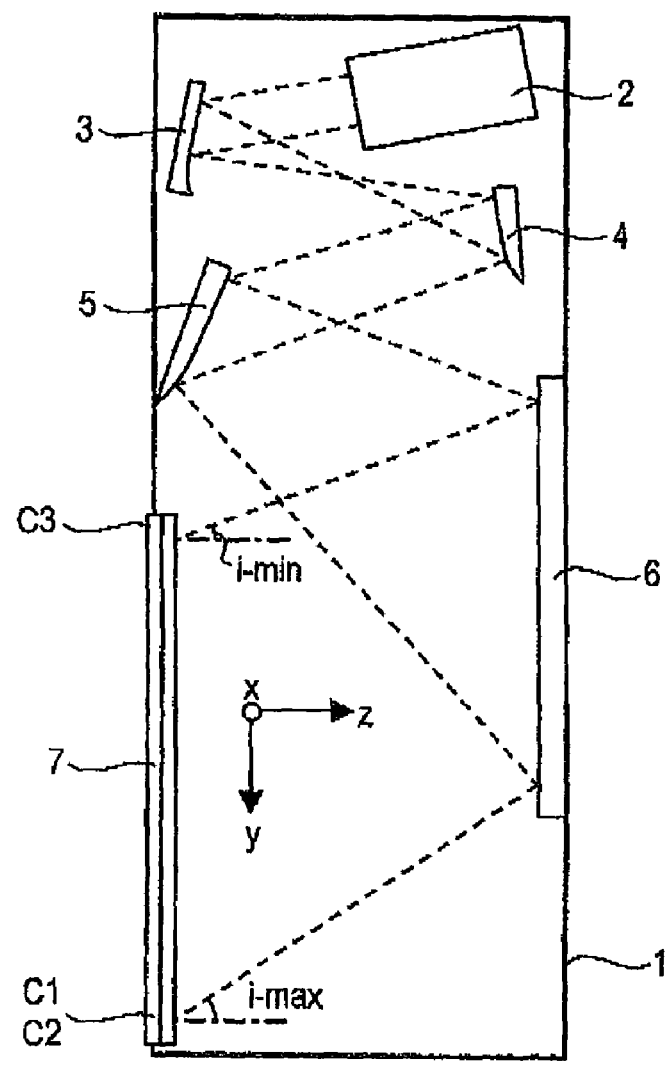
FIG. 11 illustrates one example of a rear projection display device.

In this embodiment, FIGS. 1 is a cross sectional view, and FIG. 2 is a front elevation; both schematically illustrate a structure of a rear projection display device. FIGS. 3, 4 schematically illustrate a structure of a projection unit in the rear projection display device of FIG. 1; FIG. 3 is a top plan view, and FIG. 4 is a side view. FIG. 5 is an enlarged segmentary sectional view of a screen of the rear projection display device of FIG. 1. FIG. 6 is a graph of the reflectivity characteristic of light incident to acrylic resin from the air, FIG. 7 is a graph of the reflectivity characteristic of light emitted from the acrylic resin to the air, and FIG. 8 is a graph of spectral luminous efficiency characteristics of a man.

As shown in FIG. 1, a rear projection display device of this invention includes a projection unit 2 for producing image light, a screen 7 for forming a picture when the image light is projected, first-fourth mirrors 3–6 for introducing the image light emitted from the projection unit 2 to the screen 7, and a body 1 for holding these elements incorporatively.

An image forming system is composed of the first-third mirrors 3–5. The first mirror 3 has an aspherical concave shape, the second and third mirrors 4, 5 have aspherical convex shapes. The shapes of the mirrors in the image forming system ensures corrections of aberration such as astigmatism and coma of image light and magnifications of the image light. The image light emitted from the projection unit 2 is successively reflected on the first-third mirrors 3–5, and is irradiated on the fourth mirror 6 which is arranged on an internal back surface of the body 1. The image light irradiated on the fourth mirror 6 of a flat plate shape is irradiated from slantly behind on a back surface of the screen 7 which is arranged on a front opening of the body 1, then a picture is formed.

As shown in FIG. 3, the projection unit 2 is one of three-plate type. A light source 21 comprises a reflector 21b and a metal halide lamp 21a. White light emitted from the light source 21 is splited into light of three colors by dichroic mirrors 22, 23. The first dichroic mirror 22 selectively reflects red light out of the white light emitted from the metal halide lamp 21a and transmits light of other color components. The second dichroic mirror 23 selectively reflects green light and transmits light of other color components.

The white light emitted from the metal halide lamp 21a is reflected on the reflector 21b. Then, ultra violet ray and infrared ray in the light are eliminated at an UV/IR filter (not shown), and the white light is irradiated to the first dichroic mirror 22 at an angle of 45°. Red light reflected on the first dichroic mirror 22 is introduced to the first liquid crystal panel for red 27r by the first reflecting mirror 24. The light transmitted through the first dichroic mirror 22 is irradiated on the second dichroic mirror 23 at an angle of 45°. Green light out of the light transmitted the first dichroic mirror 22 is selectively reflected on the second dichroic mirror 23 and is introduced to the second liquid crystal panel for green 27g. Blue light, the rest of the light transmitted through the second dichroic mirror 23 is successively reflected on the second and third mirrors 25, 26, and is introduced to the third liquid crystal panel for blue 27b by the second and third reflecting mirrors 25, 26.

The red light introduced to the first liquid crystal panel for red 27r is optically modulated according to image information of the red component, and is incident to the main surface 28r of the dichroic prism 28 for color synthesis. The green light introduced to the second liquid crystal panel for green 27g is optically modulated according to image information of the green component, and is incident to the main surface 28g of the dichroic prism 28 for color synthesis. The blue light introduced to the first liquid crystal panel for blue 27b is optically modulated according to image information of the blue component, and is incident to the main surface 28b of the dichroic prism 28 for color synthesis.

Light which is S-polarized to a bonded surface 28x out of the red light incident to the main surface 28r of the dichroic prism 28, that is a component of which polarization direction is vertical to the x-z plane, is reflected on the bonded surface 28x. Light which is P-polarized to the bonded surfaces 28x, 28y out of the green light incident to the main surface 28g of the dichroic prism 28, that is a component of which polarization direction is parallel to the x-z plane, transmits the bonded surfaces 28x, 28y. Light which is S-polarized to the bonded surface 28y of the blue light incident to the main surface 28b of the dichroic prism 28, that is a component of which polarization direction is vertical to the x-z plane, is reflected on the bonded surface 28y.

The color light optically modulated by each of the liquid crystal panel 27r, 27g, and 27b with correspondence to each color information is color-synthesized by the dichroic prism 28. The color-synthesized image light is emitted from the main surface 28c of the dichroic prism 28. The polarization directions of the light is respectively rotated by an angle of 90° at a λ/2 retardation plate 29, and the light is given to the image forming system.

The red light out of the image light emitted from the main surface 28c of the dichroic prism 28 is S-polarized light to the bonded surface 28x, the green light is P-polarized light to the bonded surfaces 28x, 28y, and the blue light is S-polarized light to the bonded surface 28y. The polarization directions are respectively rotated by an angle of 90° at the λ/2 retardation plate 29, then the red light is turned into P-polarized light to the bonded surface 28x, the green light is turned into S-polarized light to the bonded surfaces 28x, 28y, and the blue light is turned into P-polarized light to the bonded surface 28y.

As shown in FIG. 1, the image light transmitted through the λ/2 retardation plate 29 is successively reflected on the first-third mirrors 3–5 which compose the image forming system, and is irradiated to the fourth mirror 6 arranged on the back surface of the body 1. The shapes of the mirrors in the image forming system ensure corrections of aberration such as astigmatism and coma of the image light, and magnify the image light.

The image light irradiated on the flat plate shaped fourth mirror 6 is irradiated to the back surface of the screen 7 from slantly below. The red light out of the image light irradiated on the back surface of the screen 7 is S-polarized to the screen 7, that is the polarization direction is vertical to the y-z plane. The green light is P-polarized to the screen 7, that is the polarization direction is parallel to the y-z plane. The blue light is S-polarized to the screen 7, that is the polarization direction is vertical to the y-z plane. The y-z plane is a vertical cross section of the screen 7.

As shown in FIG. 5, the screen 7 includes a fresnel lens screen 71 formed with acrylic resin and a lenticular lens screen 72. The image light reflected on the fourth mirror 6 is irradiated on a back surface 71a of the fresnel lens screen 71.

An angle (i) formed by a normal A to the back surface 71a of the fresnel lens screen 71 and a principal ray of the image light irradiated thereon is i-max at maximum at upper corners C1, C2 of the fresnel lens screen 71 (see FIG. 1), and is i-min at minimum at a lower corner C3 (see FIG. 1). In this embodiment, the first-fourth mirrors 3–6 are set so that i-max is to be 58.27°, and i-min is to be 32.27°.

FIG. 6 is a graph for showing the reflectivity characteristic of light incident to acrylic resin from the air. In this case, the refractivity of the air is 1.00, and the refractivity of the acrylic resin is 1.492. When the image light is slantly irradiated to the screen 7, it means that the light is incident at a certain angle of incidence from the air to the acrylic resin.

The reflectivity of light irradiated to the acrylic resin forming the fresnel lens screen 71 from the air varies depending on an angle of incidence θ1, an angle formed by the light irradiated to the acrylic resin and a normal of the acrylic resin at a point where the light is irradiated. As indicated by a broken line in this graph, regarding the reflectivity characteristic S of light of which polarization direction is vertical to a plane including light irradiated to the acrylic resin and the normal of the acrylic resin at a point where the light is irradiated, the reflectivity tends to increase as the angle θ1 increases. On the other hand, as indicated by a full line, regarding the reflectivity characteristic P of light of which polarization direction is parallel to a plane including light irradiated to the acrylic resin and the normal of the acrylic resin at a point where the light is irradiated, as the angle θ1 is close to the minimum value α the reflectivity reduces. The angle α of the minimum value is an angle when P-component of the reflected light is zero and the reflected light is a plane polarized light. Such the angle of incidence is referred as polarization angle. The polarization angle α is expressed by the expression 1 below where the refractivity at both ends of the boundary is defined as n1, n2.

$$\tan \alpha = n2/n1 \qquad \text{[Expression 1]}$$

To be concrete, an angle α is approximately 56° according to the above expression when the light is incident to the acrylic resin from the air.

As indicated by a broken line of FIG. 6, the reflectivity to the screen 7 of the red light and blue light as S-polarized light out of the image light irradiated to the back surface 71a of the fresnel lens screen 71 is higher than the reflectivity of light irradiated parallel to the normal A of the screen 7, and the light utilization efficiency decreases. However, as indicated by a full line of FIG. 6, the reflectivity of the green light as P-polarized light to the screen 7 out of the image light irradiated on the back surface 71a of the fresnel lens screen 71 is lower than the reflectivity of the light irradiated parallel to the normal A of the screen 7, and the light utilization efficiency increases.

It is known that the brightness a man recognizes is generally affected by green light as compared with red and blue light. A man feels light of the wavelength 555 nm corresponding to the color of green the brightest (the visibility is high). FIG. 8 indicates the visibility of various wavelengths, taking the visibility at the wavelength 555 nm corresponding to the green as the reference. When the visibility of the green is one, the visibility of the wavelength 630 nm corresponding to the red is approximately 0.265, and the visibility of the wavelength 470 nm corresponding to the blue is approximately 0.091.

As mentioned above, when the image light is slantly irradiated to the screen 7, the visibility of green light is remarkably higher than those of red and blue light. The lowered brightness caused by the S-polarized red and blue light to the screen 7 can be compensated by making the brightness of the P-polarized green light higher, and the brightness as a whole can be increased. In conjunction with the increased brightness, light reflected on the back surface 71a of the fresnel lens screen 71 decreases, and a ghost caused by the reflected light can be reduced, and thus the image quality can be improved. It is preferred that all the component of light be P-polarized light to the screen 7.

An angle (i) formed by a principal ray of the image light irradiated to the screen 7 and the normal A of the screen 7 is set to satisfy the below expression 2. Therefore, the utilization efficiency of P-polarized light component can be improved, leading to higher brightness.

$$i\text{-min} < \alpha < i\text{-max} \quad \text{[Expression 2]}$$

The image light transmitted through the back surface 71*a* of the fresnel lens screen 71 is refracted on the back surface 71*a* at an angle k1 corresponding to the Snel principle, and then is irradiated to a protruded inclined surface 71*b* formed in a ring body shape on an emitting side of the fresnel lens screen 71.

An angle of an inclined surface 71*b* is set so that an angle (j) formed by a normal B to the inclined surface 71*b* of the fresnel lens screen 71 and a principal ray of the image light irradiated to the screen 71 is j-max at maximum and j-min at minimum on each protruded inclined surface 71*b* of the fresnel lens screen 71. In this embodiment, an inclination τ of each inclined surface 71*b* is set so that j-max is to be 38.36° and j-min is to be 22.57°.

As shown in FIG. 7, the reflectivity of light emitted from the acrylic resin composing the fresnel lens 71 to the air varies depending on an angle θ2 which is formed by the light traveling in the acrylic resin and the normal of the acrylic resin at a point where the light is emitted. As indicated by a broken line of this graph, regarding the reflectivity characteristic S of light of which polarization direction is vertical to a plane including the light traveling in the acrylic resin and the normal of the acrylic resin at a point where the light is emitted, the reflectivity increases as the angle θ2 increases. On the other hand, as indicated by a full line, the reflectivity characteristic P' of light of which polarization direction is parallel to a plane including the light traveling in the acrylic resin and the normal of the acrylic resin at a point where the light is emitted, the reflectivity decreases as the angle θ2 is made close to the minimum polarization angle β. When the light is emitted from the acrylic resin to the air, the angle β is approximately 34° according to the expression 1.

As indicated by a broken line S' in FIG. 7, the reflectivity of red and blue light which is S-polarized to the screen 7 out of the image light irradiated to the inclined surface 71*b* with a ring body shaped protrusion on an emission side of the fresnel lens screen 71 is higher than the reflectivity of light irradiated in parallel to the normal B of the inclined surface 71*b*, and the light utilization efficiency is lowered. However, as indicated by the full line P' in FIG. 7, the reflectivity of the green light which is P-polarized to the screen 7 out of the image light irradiated to the inclined surface 71*b* is lower than the reflectivity of light irradiated parallel to the normal B of the inclined surface 71*b*, and the light utilization efficiency increases.

As in the case that the image light is irradiated to the back surface 71*a* of the fresnel lens screen 71 from the air, the lowered brightness caused by the S-polarized red and blue light to the screen 7 is compensated by the increased brightness of the P-polarized green light to the screen 7, and the brightness as a whole can be improved. Reflected light at the inclined surface 71*b* of the fresnel lens screen 71 reduces, and a ghost produced by the reflected light can be reduced. Therefore, the image quality can be improved. It is preferred that all the color components be P-polarized light.

An angle (j) formed by the principal ray of the image light irradiated to the inclined surface 71*b* of the screen 7 and the normal B of the inclined surface 71*b* satisfies the expression 3 below. Therefore, the light utilization efficiency of P-polarized light component itself can be improved, leading to higher brightness.

$$j\text{-min} < \beta < j\text{-max} \quad \text{[Expression 3]}$$

Image light transmitted through the inclined surface 71*b* of the fresnel lens screen 7 is refracted on the inclined surface 71*b* at an angle k2 according to the Snel principle, and is irradiated to the lenticular lens screen 72. Then, a picture is formed by the diffusing action of the lenticular lens screen 72.

In this embodiment, the image light is irradiated from slantly behind of the screen 7. The image light may be irradiated from slantly side of the screen 7. In this case, the green light is adjusted so as to be P-polarized light to the screen 7, that is the polarization direction is parallel to the x-z plane.

In this embodiment, the polarization direction of the green light is adjusted so as to be parallel to the y-z plane. It is preferred that the polarization direction be parallel to a plane including a principal ray of the image light and the normal of a part at a point where the image light is irradiated.

Figure 12:
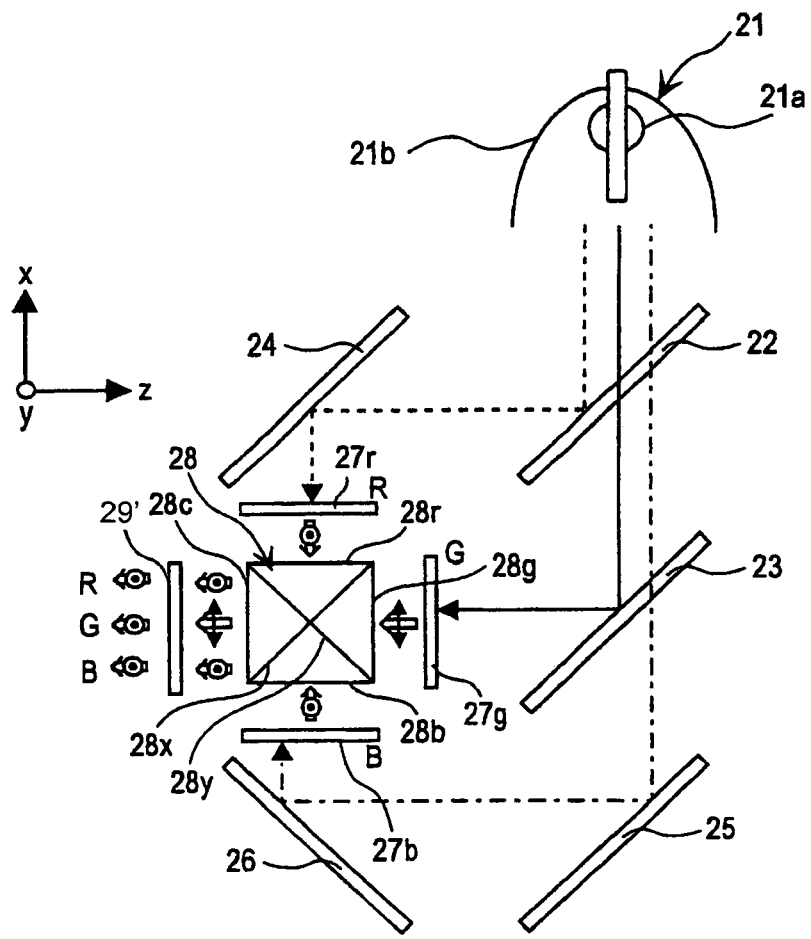
FIG. 12 is a top plan view schematically illustrating another embodiment of a projection unit of the rear projection display device of FIG. 1.

In this embodiment, the polarization direction of the green light is adjusted so that the light turns from S-polarized light into P-polarized light to the screen 7 by the λ/2 retardation plate 29. In other case, a narrow band retardation plate 29' may be used for selectively adjusting the polarization direction of the green light so that the light turns from S-polarized light into P-polarized light to the screen 7, as shown in FIG. 12. In this case, polarization directions of red and blue light do not change, and all the image light may be P-polarized light to the screen 7.

In this embodiment, the image forming system is composed of the first-third mirrors 3–5. The same effect can be gained when using a lens system.

This invention can reduce reflection on a screen and improve the brightness by making at least a green component light P-polarized light to a screen when image light is slantly irradiated to the screen. Furthermore, a ghost phenomenon caused by reflected light on the screen is prevented and the image quality can be improved.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for slantly projecting image light which is color-synthesized by the color synthesizing means on a screen, wherein polarization directions of all the color components of the image light irradiated on the screen are parallel to the plane including the image light irradiated on the screen and the normal of the screen.

2. The rear projection display device according to claim 1, wherein a color component that is S-polarized selectlveiy is changed by a polarizer to P-polarization after emerglng from the color synthesizing means.

3. The rear projection display device according to claim 2, wherein the selectively changed color component is green light and the polarizer comprises a retardation plate.

4. The rear projection display device according to claim 1, wherein the projection of the image to the display surface is from below.

5. The rear projection display device according to claim 1, wherein at least one modulated color component of the image is green.

6. The rear projection display device according to claim 5, wherein the device further comprises a selective polarizer of the green modulated color.

7. The rear projection display device according to claim 6, wherein the selective polarizer is a narrow band retardation plate.

8. The rear projection display device according to claim 1, wherein the color components comprise green, blue and red.

9. The rear projection display device according claim 8, wherein the red and blue color components when exiting the color synthesizer are P-polarized and the green color component after exiting the color synthesizer is converted from S-polarization to P-polarization.

10. The rear projection display device according to claim 1, wherein the non-perpendicular angle onto the display surface is 56 degrees below the perpendicular to the display surface.

11. The rear projection display device according to claim 1, wherein the side of the display surface towards the projector comprises a Fresnel lens screen.

* * * * *